Jan. 22, 1946.　　M. N. YARDENY　　2,393,492
MULTIREVOLUTION ELECTRICAL CONTROL SYSTEM
Filed Sept. 27, 1944　　4 Sheets-Sheet 1

MICHEL N. YARDENY
INVENTOR

BY
ATTORNEY

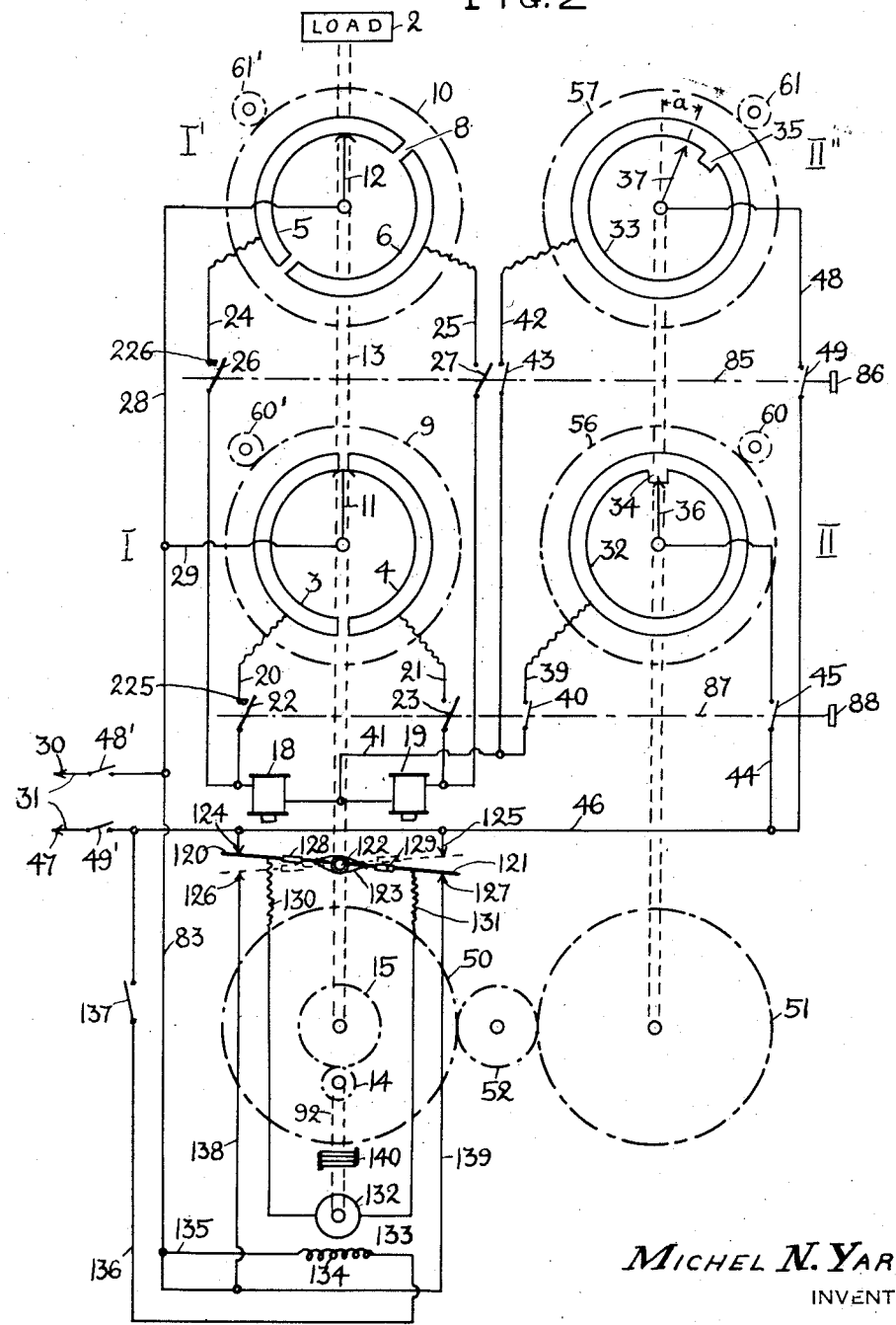

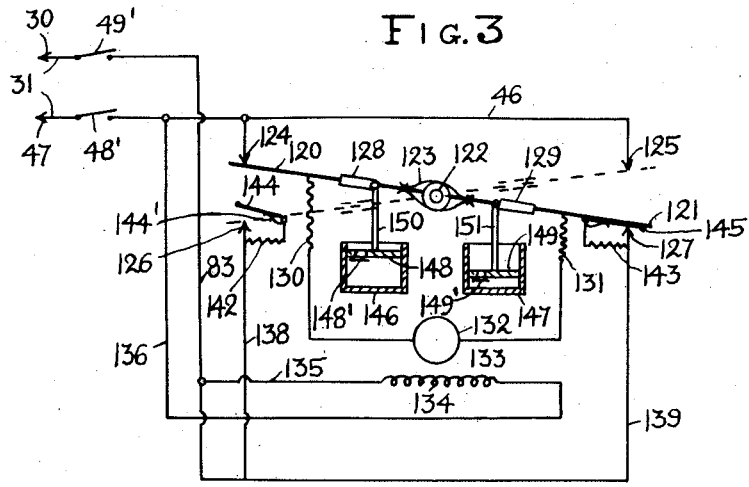
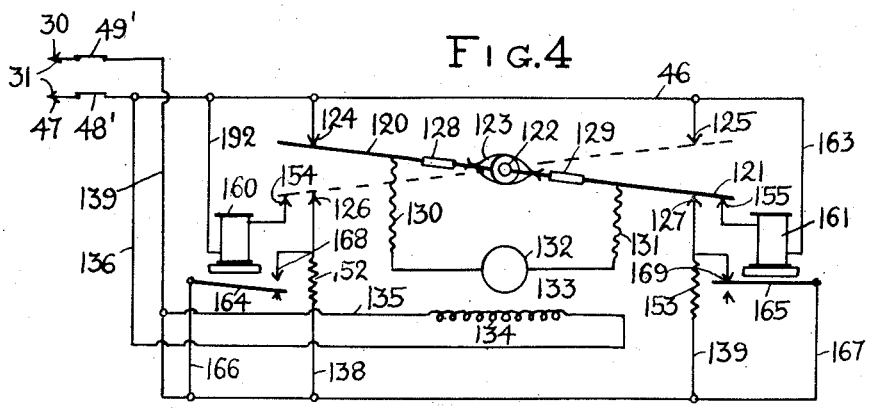
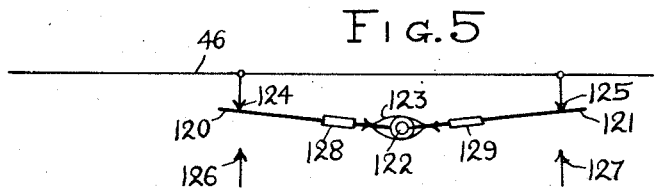
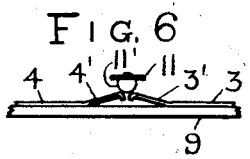
Michel N. Yardeny
INVENTOR

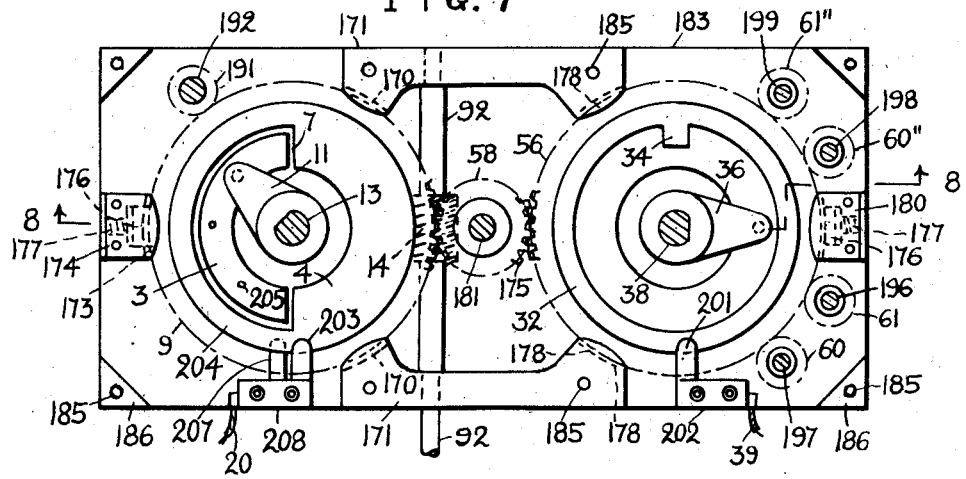
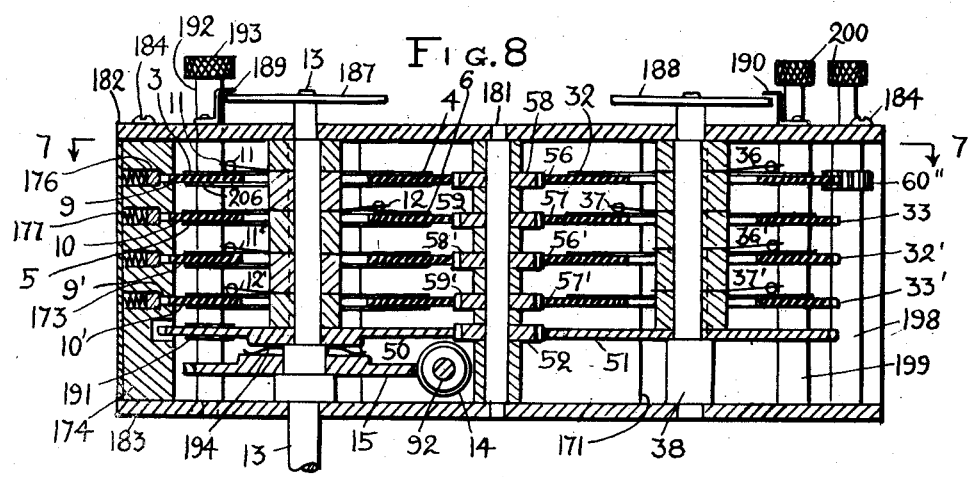

Patented Jan. 22, 1946

2,393,492

UNITED STATES PATENT OFFICE 2,393,492

MULTIREVOLUTION ELECTRICAL CONTROL SYSTEM

Michel N. Yardeny, New York, N. Y.

Application September 27, 1944, Serial No. 555,950

18 Claims. (Cl. 172—239)

The invention relates to improvements in control apparatus and particularly to improvements in control apparatus for power drive placement of a useful load or object as by an electric motor, in a predetermined position or in one of several predetermined positions.

One of the features of the invention is the provision of means for moving the useful load through a cycle of movement, for example through one complete revolution, or through a predetermined number of cycles of movement, for example through a predetermined number of revolutions.

Another of the features of the invention is the provision of means to move the useful load through a predetermined fraction of a complete cycle of movement, for example through a predetermined angular fraction of a complete revolution.

Another of the features of the invention is the provision of means to move the useful load through a predetermined number of complete cycles of movement and also through a fraction of a complete movement.

Another of the features of the invention is the provision of means for stopping the drive means when the useful load reaches the predetermined position and to provide means for suppressing hunting or oscillations of the system due for instance to inertia after the useful load has reached the predetermined position.

Another of the features of the invention is the provision of means for slowing up the movement of the drive means operating the useful load when the useful load approaches its predetermined position thereby facilitating positioning of the load.

Another of the features of the invention is the provision of means for adjusting the number of complete cycles of movement or the fraction of a complete cycle of movement through which the useful load is to be moved.

Other and further features of the invention will appear hereinafter and in the appended claims.

This application is a continuation in part of my copending application, Serial #490,767, filed June 14, 1943.

The invention is more fully explained in this specification when taken in connection with the accompanying drawings which illustrate by way of example, a now preferred embodiment of the invention.

Fig. 2 is a similar view of a modified control apparatus in which the relay means is used with a beam-type armature;

Fig. 3 is a diagrammatic view of a beam-type relay with resistors for retarding the drive means after each reversal;

Fig. 4 is a similar view showing a modified beam-type relay with resistors for retarding the drive means after each reversal, and delayed action relays cooperating with the beam type relays;

Fig. 5 is a diagrammatic view of the arm of beam-type relay such as shown in Fig. 2 with its armature in flexed condition when its arms are attracted;

Fig. 6 is a detail view of control elements showing a raised gap between two conducting segments with a contact member bridging the gap;

Fig. 7 is a plan view of a structural design of a control apparatus according to the invention, with the top cover plate removed, and certain parts shown in a section as taken on line 7—7 of Fig. 8, and Fig. 8 is a sectional view of the same, taken on line 8—8 of Fig. 7.

Figure 1:
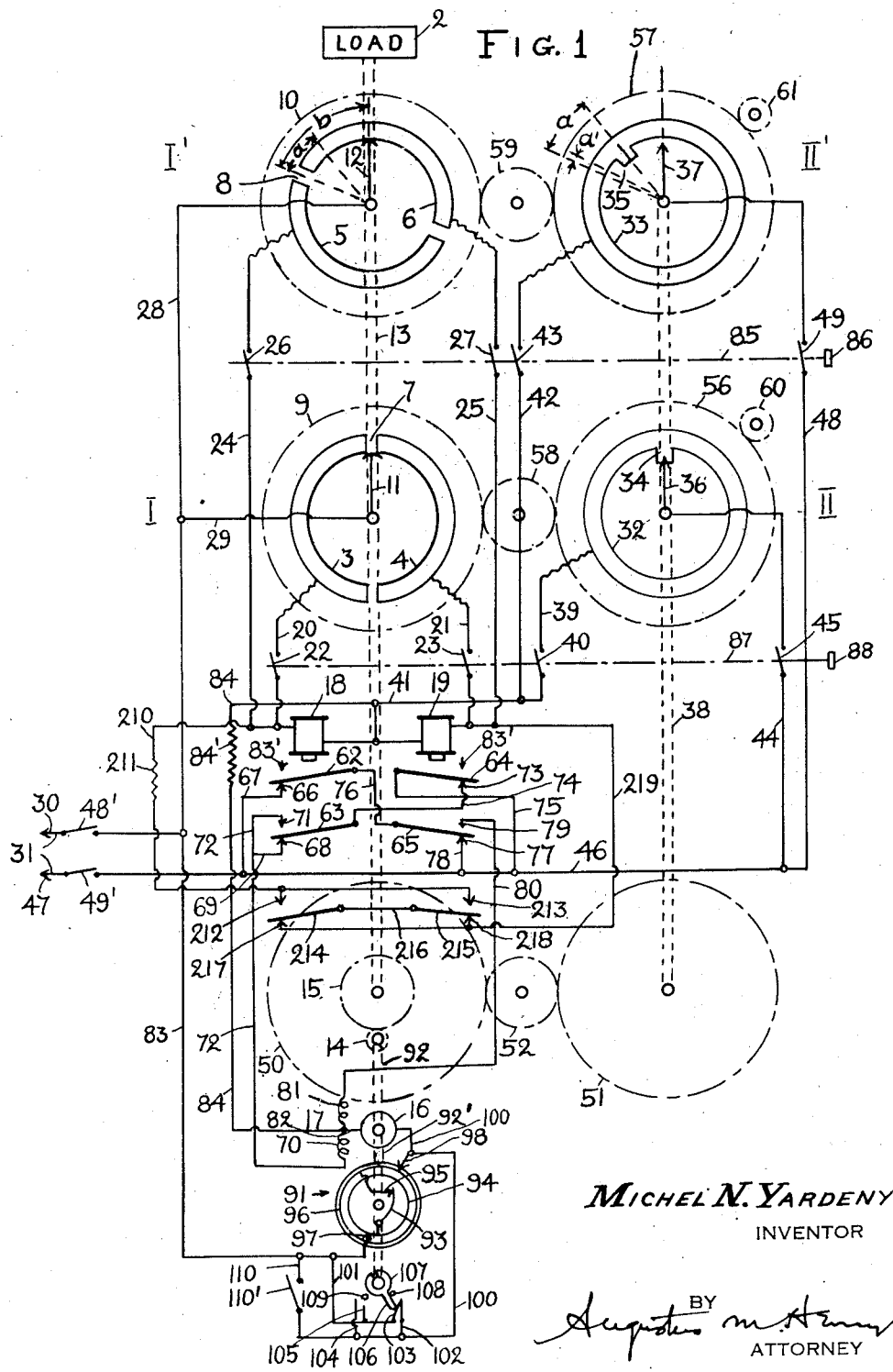
Fig. 1 is a diagrammatic view of a control apparatus according to the invention employing individual selectors for each predetermined position, relay means including relays with armatures of a certain type for the control of the drive means, and means for retarding the movement of the drive means at or near the stopping position.

The control apparatus according to Fig. 1 shows two position selectors each comprising two coacting units I, II; I', II', etc. The number of the selectors corresponds to the number of different predetermined positions in which a useful load 2 may be placed, only two selectors being shown for the sake of clearness. Units II, II' serve to control the number of revolutions, half revolutions or other desired characteristic cycles of movement of the useful load, while units I, I' serve to control the accurate positioning of the useful load within the last revolution, half revolution or other cycle of movement of the useful load. Each of the units I, I', also, comprises a pair of control elements. One of these control elements is a contact arm 11 or 12, while the other is composed of two metal segments or conducting members 3, 4 or 5, 6 separated by a gap or neutral point 7 or 8. Said segments are mounted on an insulation disk 9 or 10. The contact arms 11, 12 are for slidably engaging the segments 3, 4 or 5, 6, respectively; and are so constructed that when either of them reaches the gap or neutral point between the segments operatively associated with said arm, the segments are bridged by the arm. The contact arms are mounted on a common shaft 13 which is also arranged to operate the useful load 2 and connected by suitable step-down gears 14, 15 and a shaft 82 to the armature 16 of a reversible electric motor, generally designated 17.

The motor circuit is controlled by two relay coils 18 and 19, one for each direction of rotation. The outer ends of the coils are connected by leads 20, 21 and switches 22, 23 with the segments 3, 4 and by leads 24, 25 and switches 26, 27 with the segments 5, 6. The contact arms 11, 12 are connected by leads 28, 29 to a terminal 30 of a source of current 31.

Each of the units II, II' also comprises one pair of control elements. One element includes a metal ring 32 or 33 with a projection 34 or 35 mounted on an insulation disc 56 or 57. The other control element includes a contact arm 36 or 37, these arms being mounted on a common shaft 38. The contact arms do not engage the rings 32, 33 themselves but are arranged to engage the points or projections 34, 35 only. The ring 32 is connected by a lead 39 and a switch 40 to a lead 41 extending from the joined ends of the relay coils 18, 19, and ring 33 is connected by a lead 42 and a switch 43 to the common lead 41. The contact arm 36 is connected by a lead 44 and a switch 45 to a lead 46 extending to the other terminal 47 of the source of current 31. The arm 37 is connected by a lead 48 and a switch 49 to the lead 46.

Switches 26, 27, 43, 49 are mechanically connected by a common rod 85 operated by a handle 86 and switches 22, 23, 40, 45 are mechanically connected by a common rod 87 operated by a handle 88.

The two sets of switches may be mechanically coupled so that the closing of one set of switches will cause an opening of the other set of switches. Such coupling means are well known in the art and need not be described here in detail. It should also be understood that instead of switches operated by rods and handles, rotary type switches or any other suitable type of switches may be used.

Switches 48', 49' may be included in the leads 28, 46 for disconnecting the apparatus when not in use.

As it is apparent from the drawing, each of the relay coils 18, 19 is connected in series with the two pairs of control elements of unit I, I' or II, II', depending on which set of switches 22, 23, 26, 27 and 40, 45, 43, 49 is closed. The shafts 13, 38 with the contact arms of the respective units are operatively connected together by gears 50, 51, and an idler gear 52. The ratio of these gears is such that the relative angular position of the two shafts slightly changes with every revolution. If, for instance, the gear 50 is smaller than the gear 51, having, for example, 55 teeth while the gear 51 has 56 teeth, then the relative angular position of the arms 12, 37 will be changed by a small angle $a'$ corresponding to 55/56 of 360° after every revolution. In the zero position the arms 12, 37 for instance, may be in the same angular position. Then after several revolutions the arms 12, 37 will be relatively displaced by a relatively large angle $a$, the arm 12 having advanced relative to arm 37. The angle $a$ will determine the number of revolutions necessary for bringing the two arms back into the zero position and hence into the same relative angular position as before.

The discs 9, 10 of units I, I' and the discs 56, 57 of units II, II' may be made in the form of gears connected together by idler pinions 58, 59; these disks, concentric with shafts 13 and 38 but not fixed to said shafts, are suitably mounted for rotational adjustment. The ratio between the gear discs 9, 56 and 10, 57 is preferably the same as the ratio between the gears 50 and 51.

Manually or otherwise operable pinions 60, 61 are provided, engaging the gear discs 56, 57 for the adjustment of the discs to new positions. It is of course also possible to provide friction or other means to set the arms for different predetermined positions.

For controlling the motor circuit, each relay coil 18, 19 has three contact arms, the relays being of a conventional triple pole, double throw type. The coil 18 operates arms 62, 63, 214 and the coil 19 operates arms 64, 65, 215. The arm 62 normally engages a contact point 66 connected by a lead 67 to the lead 46. The arm 63 normally engages a contact point 68 connected by leads 69 and 72 to one end of a reversing field winding 70 of the motor 17. When attracted by the coil 18, the arm 63 engages a contact point 71 connected by lead 72 with the same winding 70 thus causing rotation of the motor in one direction. The contact arm 64 of the relay coil 19 normally engages a contact point 73 connected by a lead 74 with the arm 63 of relay 18 and is connected by a lead 75 with the lead 46. When attracted arms 62 and 64 engage blind points 83', the arm 65 is connected by a lead 76 with the arm 62 of relay 18 and normally engages a contact point 77 connected by a lead 78 with the lead 46. When attracted by the coil 19, the arm 65 engages a point 79 connected by a lead 80 with one end of the second reversing field winding 81 thus causing a rotation of the motor in the opposite direction. The relay arms 214 and 215 are connected together by a lead 216 and normally engaged contact points 217, 218 connected by a common lead 219 to one end of relay coil 19. The arms 214, 215 when attracted by the relay coils, engage contact points 212, 213, connected by a common lead 210 to the coil 18 through a resistor 211.

The common lead 41 of the relay coils is connected by a lead 84 and a resistor 84' with the joined ends of the motor windings 70, 81. The resistance of resistor 84' is selected so that the current through the resistor will be insufficient to energize the coils 18 or 19 to a point where they can attract their arms, but will maintain otherwise energized coils sufficiently magnetized to retain their arms raised after they have been attracted. When the arms of both relays 18, 19 are attracted the motor will be caused to stop, the arms 62, 64 then resting against blind points 83'.

The joined ends of the field windings 70, 81 are also connected to one terminal of the armature 16 by a lead 82, the other armature terminal being connected by leads 100, 83 to the terminal 30 of the source of current 31 through a speed reducing governor generally designated 91, mounted preferably on a shaft extension 92' of the motor 17. It is of course also possible to couple the governor 91 through gears to the motor. The governor 91 serves to facilitate stopping of the motor when one of the gaps is bridged by the corresponding energized contact arm and to prevent hunting of the motor back and forth caused by inertia in the system. The governor comprises a spring 93 connected with a collector ring 94 and normally engaging a contact point 95 connected with a collector ring 96. The rings 94, 96 are engaged by contact brushes 97, 98 thus connecting the leads 83, 100 which in turn connect the armature to terminal 30. The governor can be bypassed by leads 100, 101 connected with two pairs of spring contacts 102, 103, and 104, 105 of a reversing switch. The spring contacts tend to urge their contacts into a disengaged position. A finger 106 supported on a collar 107, frictionally mounted on the shaft extension 92' normally rests against one of two stops 108, 109, depending on the direction of the motor rotation and closes one of the pairs of contacts 102, 103 or 104, 105 during a short period after each reversal of the motor rotation. However, while the finger 106 moves from one stop to the other, both pairs of spring contacts 102, 103 or 104, 105 are disconnected or opened. The by-pass through leads 100, 101 is now interrupted and the governor is connected in series with the armature 16 of the motor by leads 100, 83. If during this short period the motor speed exceeds a predetermined value, spring 93 will leave point 95 due to the centrifugal force thus interrupting the motor circuit until the centrifugal force has sufficiently decreased by the reduction of the motor speed to permit a return of spring 93 into its position engaging point 95. This reduction of the motor speed caused by the repeated fluctuation of the motor current will prevent a repeated overrunning of a gap, such as 8, by a contact arm such as 12.

A lead 110 including a switch 110' may be provided for permanently short circuiting the governor if desired.

Apparatus as shown in Fig. 1 may be conveniently used for operating a device, such as a core of a radio tuning coil as, for instance, by means of a screw (not shown) rotated by the load shaft 13 of the device. The selector units I—II, I'—II', etc., are set for such and other purposes by means of the manually operated pinions 60, 61 in positions corresponding to the desired positions of the core, requiring a predetermined number of revolutions of the load shaft 13. Hence each selector, when energized, will cause the shaft 13 to make as many revolutions plus such a fraction of a revolution as are necessary to bring the core into the particular predetermined position. The number of the revolutions of the shaft 13 before reaching a new position is of course different and depends on the prior position of the core.

Assume, for instance, that the core shall have two predetermined positions, one say at a zero distance from the starting point, and the other at a distance of a fraction of an inch, and that the screw, operated by the shaft 13, must make for instance, twenty revolutions and 60° for placing the core in the second position. The selectors are then preset as follows: Assuming the first selectors, I—II controlling the zero position of the core, are in their stopping positions of the core, are in their stopping positions as shown in Fig. 1, with the arms 11, 36 parallel to each other, for example, and engaging the gap 7 and projection 34 respectively, and further assuming that the gap 8 and projection 35 were originally in the same positions as for gap 7 and projection 34, that is, in positions in which they would be engaged by the arms 12 and 37 respectively, then the selectors I', II' are set for the desired new position of the load by rotating the discs of the selector I'—II' in the direction of the operating movement so as to cause the shaft 13 to make twenty full revolutions and 60° (for instance, to the left in Fig. 1), thereby causing the gap 8 and projection 35 to be placed in the position shown in Fig. 1. The positions of selector units I and II are not affected by such setting of units I' and II'.

After twenty full revolutions of the disc 10 (or forty half revolutions), by hand, the gap 8 is returned to its original position. By adding a fractional revolution of 60°, the gap 8 will be displaced to the left, approximately as shown in Fig. 1, the angle $b$ being equal to the additional 60°. The projection 35, however, will be lagging behind with each revolution of the disc 57 by the small angle $a'$, representing $360° \times 55/56$ of one revolution, and at the end of twenty revolutions will lag by the large angle $a$, representing the sum total of the angles $a'$ for twenty revolutions of the disc 10.

Other sets of discs, if any, will be similarly preset.

In the position of the selectors shown in Fig. 1, the load is in its zero or starting position, corresponding to the stopping position of the selector I—II. If it is desired to place the load in the next position, corresponding to the setting of selectors I'—II', the switches 22, 23, and 40, 45 are opened and switches 26, 27, 43, 49 are closed (with the switches 48', 49' closed). Both the relays are now deenergized. Since the arm 37 does not touch the projection 35, the motor will always start rotation in a certain direction determined by the connections to the relay arms, for example, in a clockwise direction; the motor will move arms 12 and 37, in this direction, away from gap 8 and projection 35 or, in other words, in this case in the wrong direction. But this is to be corrected, in the manner now to be described.

The motor current will flow from the terminal 30 and switch 48' through the leads 83, 101, closed contact points 103, 102, or closed contacts 93, 95 of the governor 91, lead 100, armature 16, winding 70, lead 72, point 68, arm 63, point 73, arm 64, and leads 75, 46 to the switch 49' and terminal 47. The relay coils will remain deenergized their circuits being disconnected at the arm 37 until this arm reaches the projection 35. A small current will pass, however, from the lead 41 through the lead 84 and resistor 84' while the motor circuit is closed, but this current will be insufficient to cause the relay coils to attract the arms 62, 63, 64, 65, 214 and 215. The motor will continue its rotation in the same direction until the contact arm 37 touches for the first time the projection 35. The arm 12 at that moment will engage the segment 6 due to the previously explained setting of this arm thus momentarily energizing the relay coil 19, the circuit of which will be closed from the terminal 30 and switch 48' through the lead 28, arm 12, segment 6, lead 25, switch 27, coil 19, leads 41, 42, switch 43, ring 33, projection 35, arm 37, lead 48, switch 49, lead 46, switch 49' and terminal 47. The relay arms 64, 65, 215 will be attracted, closing the motor circuit as follows: From the terminal 30 and switch 48', through the leads 83, 101, contact points 103, 102, lead 100, armature 16, winding 81, lead 80, point 79, arms 65, 62, point 66, leads 67, 46 to the switch 49' and terminal 47. The direction of the motor rotation will be therefore reversed so as to cause the arm 12 to move towards the gap 8 and the arm 37 to move towards the projection 35. The arms 64, 65, 215, once attracted by the relay coil 19, will remain so attracted; the current through the resistor 84' being sufficient to energize the coils for retaining the already attracted arms. The arms of the relay 19 will also remain attracted when the arms 12 moves from segment 6 to segment 5, because sufficient current will still flow through the relay 19 to retain the raised arms, a connection now being established between segments 5 and 6 through the lead 24, switch 26, lead 210, resistor 211, point 213, raised arm 215, lead 218, arm 214, point 217, and lead 219 to the lead 25, switch 27 and segment 6, the resistances of resistors 84' and 211 being selected so that with one or both resistors in series, the relay coils cannot attract the arms but are still effective to retain the already attracted arms.

Because of the angular difference $a$ between the gap 8 and the projection 35, the relay 18 will remain deenergized when the arm 12 passes the gap 8, since this gap during the first revolutions of the shaft 13 will be bridged by the arm 12 only when the arm 37 is disengaged from the projection 35. With each revolution of the shaft 13, however, the arm 37 will lag by the angle $a'$ behind the arm 12, and at the end of twenty revolutions (or 40 half revolutions) the total lag will be equal to the angle $a$. The arm 37 will then engage the projection 35. The arm 12 will continue its rotation only until it bridges the gap 8 when both the relay coils will be simultaneously energized, attracting all six relay arms and disconnecting the motor circuit. The width of the projection 35 is sufficient to remain in engagement with the contact arm 37 if the arm 12 slightly overruns the gap 8 by inertia. This will energize the other relay 18, and cause the arm 12 to return into the gap. As soon as the arm 12 bridges the gap, both relays are energized, attracting both arms 214, 215 thereby interrupting the motor current and breaking the connection between the segments 5, 6. When the arm 12 engages for a moment the segment 5 leaving segment 6, relay 19 will be deenergizd and its arms 64, 65, 215 will be released, because the current through the retaining resistors 84', 211 was interrupted when both relays were energized. The motor will be now reversed, as was explained above. As previously explained the governor will become operative at the moment of the reversal of the motor rotation thereby reducing the motor, thus permitting arm 12 to settle in the gap 8.

The arms 11 and 36 of units I and II will be then moved to new positions, with a lag of twenty revolutions and 60° between them. If the switches 26, 27, 43, 49 are now opened and switches 22, 23, 40, 45 closed the motor will rotate in the opposite, or clockwise direction for bringing the arms 11, 36 back to the zero position as shown in Fig. 1.

If the gap 8 is initially placed to the right of the arm 12 and the point 35 to the right of the arm 37, the motor starts always in the clockwise direction and moves in the right direction from the beginning, then no corrective of the motor rotation will be required.

It is understood that any suitable mechanical, magnetic or electro-dynamic braking means may be provided for stopping the motor or the shaft 13 when the desired predetermined position is reached by the load. Similarly any suitable arrangement may be provided for preventing hunting or oscillations of the motor when the gap 8 is reached by the contact arm 12 and the projection 35 is at the same time engaged by the contact arm 37. Such antihunting arrangements are disclosed, for instance, in my U. S. Patent No. 2,342,717 and may include raised end portions of the conducting members at the gap for a yieldable engagement by a ball-shaped point on the contact arm, an arrangement of this kind is illustrated in Fig. 6 as comprising a ball 11' supported on arm 11, raised end portions 3', 4' engaged by the ball.

The apparatus according to the invention can be used with different types of relays and with different types of the motors. One of such modifications is shown in Fig. 2 illustrating the use of a beam-type relay and of a shunt wound direct current motor. The selectors are the same as in Fig. 1 and the identical parts are denoted by the same numerals, including the relay coils 18 and 19. These coils operate a flexible contact beam comprising an armature having two contact arms 120, 121 pivotally supported at 122. Springs 123 urge the arms to stay in a straight line, but will yield as shown in Fig. 5 when both the contact arms are simultaneously attracted by the magnet coils 18, 19. The arms have no intermediate position and always engage two of the contact points 124, 125, 126, 127. The mechanical construction of the arms 120, 121 is such that when relay coil 18 is energized, contact arm 120 engages contact point 124, while the contact arm 121 is urged by springs 123 against contact point 127. If now both relays 18 and 19 are energized, contact arm 120 will retain its position, but contact arm 121 will engage contact point 125. If now relay coil 18 is deenergized, the contact arm 120 will be urged by spring 123 against contact point 126, but contact arm 121 will engage as before contact 125. If now coil 19 is also deenergized, both arms 120 and 121 will remain unchanged in position, that is, respectively engaging contact points 126, 125. Thus for each possible position of contact arm 120, there are two possible positions of contact arm 121; and vice versa. They also cannot remain in a deflected position engaging the points 124, 125 unless both the relay coils are energized. The contact arms 120 and 121 are insulated from each other for instance by insulation blocks 28, 29, and are connected (Fig. 2) by flexible leads 130, 131 to the armature 132 of a motor 133. The shunt winding 134 of the motor is connected by leads 135, 136 and a switch 137 to the leads 83, 46 respectively connected with terminals 30, 47 of the source of current 31. The points 126, 127 are connected by leads 138, 139 to the lead 83.

A frictional sliding clutch 140 may be provided between the motor and the gear or pinion 14. Such a clutch acts to prevent hunting of the motor by absorbing its inertia by friction after each reversal of rotation of the motor. There are omitted from Fig. 2, the resistor 84' and its connections, the governor 91, the reversing switch, and the gears 58, 59 of Fig. 1. Discs 9 and 10 can be adjusted independently of discs 56, 57 by means of pinions 60', 61'.

Instead of a gear connection between the pinions and the discs, a friction drive may be provided. In order to adjust the discs of units I, II and I', II' independently, gap 7 or 8 is first placed in a position according to the desired final angular position of shaft 13 by means of pinion 60' or 61'. Then disc 56 or 57 is turned by means of pinion 60 or 61 so that contact point 34 or 35 is placed in the same angular position as gap 7 or 8. Thereupon, contact point 34 or 35 is displaced by an angle $a$ corresponding to the desired total number of revolutions of shaft 13 and hence of load 2. The displacement of the contact point 34 or 35 may be to the right or to the left corresponding to the desired direction of rotation.

It is also possible to adjust the contact arms rather than the discs.

Operation of the apparatus according to Fig. 2 is similar to the operation of the device shown in Fig. 1. The relays and motor operate as follows:

The relay arms 120, 121 normally remain in the positions shown in full lines or in the positions shown in dotted lines (Fig. 2), but cannot remain in any intermediate position as previously mentioned. For this purpose one of the relay coils may have a slightly greater inductance or a time lag. Thus if the coil 18 acts slower in releasing the arm 120, for instance, the arms will always assume the position shown in full lines in Fig. 2 when the coils are deenergized by opening all the switches simultaneously. Instead of or in addition to controlling the position of relay arms 120, 121 by providing relays having a different speed of operation, it is also possible to provide means causing switches 23 or 27 to close before or after switches 22, 26 when switch rods 81 or 85 are operated. Such means may comprise for example an elongated contact element 225 for switch 22 and an elongated element 226 for switch 26, and a wider opening of the arms of switches 23, 27 than of the arms of switches 22, 26 as shown in Fig. 2. Then switch arms 22, 26 will disengage the corresponding elements 225, 226 after switch arms 23, 27 are disengaged.

If the switches 26, 27, 43, 49 are closed, as well as the switches 48', 49', both the relay coils will at first remain deenergized as was explained in connection with the operation of the device of Fig. 1. Assuming now the shunt field switch 137 to be closed, the motor 132 will be energized by the current flowing from the terminal 47 through the switch 49', lead 46, contact point 124, arm 120, flexible lead 130, armature 132, flexible lead 131, arm 121, contact point 127, and leads 139 and 83 to the other terminal 30 of the source of current 31. The motor will always start rotation in the same direction, which if the wrong one will be corrected as soon as the contact arm 37 touches the contact projection 35 for the first time as explained in connection with Fig. 1.

At the end of the operation, when the gap 8 is finally bridged by the contact arm 12 and both the coils 18, 19 are energized, both the arms 120, 121 will be attracted by the coils against the resistance of the springs 123 as shown in Fig. 5. The armature 132 will be short circuited through the lead 46 and will be more rapidly stopped by dynamic braking caused by the magnetic field of the shunt winding 134, this winding being energized as long as switch 137 is closed.

Instead of providing a governor as shown in Fig. 1 for retarding the motor rotation after each reversal to suppress oscillations or hunting of the motor, the arrangement shown in Fig. 3 may be used in which resistors and dash pots are employed.

According to Fig. 3 resistors 142, 143 connect points 126, 127 with resilient contact members 144, 145, normally raised as shown at the left in Fig. 3, by the action of springs 144' and therefore are separated from points 126 and 127 respectively. Thus when the contact arm 120 or 121 is moved downward, it first engages the raised end of the contact member 144 or 145, thereby closing the circuit for the motor through the resistor 142 or 143. The motor will therefore rotate slowly and can be easily stopped without hunting or oscillating. The connected resistor is short circuited when the arm 120 or 121 finally presses resilient contact member 144 or 145 against the corresponding contact point 126 or 127. To increase the length of time during which a resistor is effective, dash pots 146, 147 may be provided, with plungers 148, 149 connected by rods 150, 151 to the respective relay arms 120 and 121. Valves 148', 149' in the plungers close by-pass openings in the plungers when the plungers are moved downward, thereby retarding their movement, and are opened by the upward movement of the plungers, allowing the plungers to move rapidly upward.

Another similar arrangement using resistors and time delayed relays for retarding the motor rotation after reversal is shown in Fig. 4, in which resistors 152, 153 are included in the leads 138, 139 so that the motor circuit is first closed through one of these resistors when the arms 120, 121 engage the respective contact points 126, 127. In addition to engaging the points 126 and 127 arms 120 and 121 engage at the same time respective contact points 154 or 155. Each of these points is connected to an end of one of the relay coils 160, 161, the outer ends of which coils are connected by leads 162, 163 to the lead 46. The coils, when energized, attract contact arms 164, 165 connected with respective leads 166, 167, both connected by lead 139 to terminal 30. The arms 164, 165 when attracted engage contact points 168, 169 connected with the points 126, 127, thereby short-circuiting or by-passing the resistors 152, 153, and restoring the normal rotational speed of the motor.

The relay coils 150, 161 if desired may be of a type slow to attract for increasing the period of time during hich the motor is operated at a reduced speed.

A preferred structural design of an apparatus according to the invention is illustrated in Figs. 7 and 8.

As here shown, selector discs 9, 10, 9', 10' are slidably and rotatably supported in horizontal slots 170 in posts 171 at one side and in slots 173 in an end post 174. The posts are sufficiently broad so that each slot covers several teeth at the periphery of the discs. Guiding blocks 176 may be placed in the slots 173 and urged by springs 177 against the periphery of the discs so that the discs are held accurately in their intended positions in the slots by being pressed against the bottoms of slots 170. The posts 171 also have slots 178 for discs 56, 57, 56', 57', An end post 180 is provided similar to the post 174 with slots 173 and guiding blocks 176 and springs 177. The toothed peripheries of the discs mesh with idler pinions 58, 59, 58', 59', rotating on a common shaft 181, the ends of which are held in end plates 182, 183. The posts 171, 174, 180 are held between these end plates by screws 184, threaded in holes 185 in the ends of the posts. Additional corner posts 186 may be provided between the plates. The shafts 13 and 38 have the arms 11, 12, 11', 12' and 36, 37, 36', 37' keyed thereon. The ends of the shafts 13 and 38 are journaled in recesses in the end plates 182, 183. The shaft 92 is connected to a motor (not shown), and the shaft 13 is connected to a useful load (not shown). The upper ends of the shafts 13 and 38 mount indicating dials 187, 188 with suitable divisions or calibrations to indicate the position of the load relative to fixed indices 189, 190. The shafts 13 and 38 are connected together by gears 50, 51, 52 keyed to their respective shafts. The ratio of the gears is selected according to the desired maximum number of revolutions of the useful load. Thus with the ratio 55/56 it will be possible to impart up to 25 revolutions to the useful load.

The gear 50 is also engaged by a pinion 191 on a shaft 192 extending above the upper end plate 182 and provided with a top knurled head 193 for its manual operation if it is desired manually to change the load position. A dished spring 194 (Fig. 8), for serving as a frictional clutch may be placed between the gear 50 and the worm gear 15. Gear 15 is rotatably mounted on the shaft 13, while gear 50 is keyed to shaft 13. The clutch spring is selected for frictional resistance so that the worm gear 15 normally functions to drive the gear 50 and the shaft 13, but said spring slides relatively to the gear 50 and the shaft 13 when the gear 50 is manually rotated for manual positioning of the load connected to shaft 13, the gear 50 being then held by the irreversible worm drive 14, 15.

The discs 56, 57, 56', 57' are engaged by pinions 60, 61, 60'', 61'' mounted on shafts 196, 197, 198, 199 with top knurled heads 200 for their manual operation, when it is desired to reset the discs to new positions.

The rings 32, 33, 32', 33' are engaged by contact brushes 201 mounted on an insulation post 202 and connected to leads 39, 42 etc. Contact brushes 203 engage the peripheries of semi-annular extensions 204 connected to the segments 4, 6, etc. The segments 3, 5, etc., are shown as connected by rivets 205 with rings 206 underneath the discs 9, 10, etc., engaged by contact brushes 207. The brushes 201 are connected to the leads 20, 24, etc., and the brushes 207 are connected to the leads 21, 25, etc.

The width of the contact projections 34 must preferably be sufficient to allow for any possible backlash in the gears 50, 51, 52. It should be noted that such a backlash does not affect the accuracy of the device since the final stopping position is determined by one of the contact arms 11, 11', 12, 12' bridging the corresponding gap between the segments 3, 4, 5, 6.

Control apparatus as shown in Figs. 7, 8 may be used in conjunction with a circuit such as illustrated in Fig. 1 or with any other suitable circuit and is within the scope of the invention.

As previously explained the load 2 is connected by any suitable means to shaft 13 and the motor or other drive means is connected to shaft 52. Shaft 52 when rotated drives gear wheel 15 through gear wheel 14. Gear 14 is frictionally coupled through spring 194 with gear 50 keyed to shaft 13 so that a rotation of gear 50 causes shaft 13 to rotate and hence also the useful load and the contact arms 11, 11', 12, 12'. The gear 50 also drives the gear 51 through gear 52, gear 51 being keyed to shaft 38. Gear 51 causes this shaft to rotate and with it the contact arms 36, 36', 37, 37' on shaft 38.

The discs 9, 10, 9', 10' and 32, 33, 32', 33' can be set by rotating the appropriate shaft 196, 197 by means of knurled heads 200.

If it is desired to rotate shaft 13 and hence the load manually, shaft 192 is rotated. The friction disc or gear disc 191 supported by shaft 192 will then rotate gear 50 by overcoming the friction coupling formed by spring 194, said gear being held stationary by the irreversible worm drive 14, 15.

It will be understood that various features and principles of each of the embodiments of the invention above described or referred to may be utilized or substituted in other embodiments.

While the invention has been described in detail with respect to certain particular preferred examples, it will be understood by those skilled in the art after understanding the invention that various changes and further modification may be made and parts of the improvements may be used without others without departing from the spirit and scope of the invention, and, therefore, it is intended in the appended claims to cover all such changes and modifications.

I claim:

1. Control apparatus for placing a useful load in a predetermined position, comprising reversible drive means capable of making several cycles of movement for placing the useful load in the predetermined position; means for rendering the drive means operative; a pair of relatively movable control elements, one element comprising conducting means having a neutral point, the other element comprising a contact arm for engaging the conducting means; a second pair of relatively movable control elements, one element of the second pair comprising a contact point, the other element of the second pair comprising a contact arm for engaging the contact point, one movable element of each pair of control elements being arranged to be moved by the drive means through a range of more than one cycle of movement, transmission means between the two elements moved by the drive means, said transmission means being arranged to move the control elements at different speeds for causing the control elements to be progressively displaced relative to each other; means to electrically control the direction of movement of the drive means by the position of the first contact arm at one or the other side of the neutral point; and means to stop the drive means in response to the first contact arm reaching the neutral point and the second contact arm simultaneously reaching the contact point as controlled by the progressively changed displacement between the contact arms, the original relative positions of the control elements determining the number of cycles of movement or fractions thereof required for bringing both contact arms in simultaneous engagement with the neutral point and the contact point respectively.

2. Control apparatus for placing a useful load in a predetermined position, comprising reversible drive means capable of making a plurality of revolutions for placing the useful load in the predetermined position; means for rendering the drive means operative; a pair of relatively rotatable control elements, one element comprising conducting means having a neutral point, the other element comprising a contact arm for engaging the conducting means; a second pair of relatively rotatable control elements, one element of the second pair comprising a contact point, the other element of the second pair comprising a contact arm for engaging the contact point, one rotatable element of each pair of control elements being arranged to be rotated by the drive means through a range of more than one revolution; transmission means between the two elements rotated by the drive means, said transmission means being arranged to rotate the control elements at different speed for causing the control elements to be progressively angularly displaced relative to each other; means to electrically control the direction of rotation of the drive means by the position of the first contact arm at one or the other side of the neutral point; and means to stop the drive means in response to the first contact arm reaching the neutral point and the second contact arm simultaneously reaching the contact point as controlled by the progressively changed angular displacement between the contact arms, the original relative positions of the control elements determining the number of revolutions or fractions thereof required for bringing both contact arms in simultaneous engagement with the neutral point and the contact point respectively.

3. Control apparatus for placing a useful load in a predetermined position, comprising reversible drive means capable of making several cycles of movement for placing the useful load in the predetermined position; a pair of relatively movable control elements, one element comprising conducting means having a neutral point, the other element comprising a contact arm for engaging the conducting means; a second pair of relatively movable control elements, one element of the second pair comprising a contact point, the other element of the second pair comprising a contact arm for engaging the contact point, one movable element of each pair of control elements being arranged to be moved by the drive means through a range of more than one cycle of movement; transmission means between the two elements moved by the drive means, said transmission means being arranged to move the control elements at different speed for causing the control elements to be progressively displaced relative to each other; means to electrically control the direction of movement of the drive means by the position of the first contact arm at one or the other side of the neutral point; means to stop the drive means in response to the first contact arm reaching the neutral point and the second contact arm simultaneously reaching the contact point, as controlled by the progressively changed displacement between the contact arms, the original relative position of the control elements determining the number of cycles of movement or fractions thereof required for bringing both contact arms in simultaneous engagement with the neutral point and the contact point respectively; means to start the movement of the drive means always in the same direction independent of the control elements; and means to connect the drive means for movement of the contact arms toward the neutral point and the contact point respectively in response to the second contact arm reaching the contact point for the first time.

4. Control apparatus for placing a useful load in a predetermined position, comprising reversible drive means capable of making several cycles of movement for placing the useful load in the predetermined position; a pair of relatively movable control elements, one element comprising conducting means having a neutral point, the other element comprising a contact arm for engaging the conducting means; a second pair of relatively movable control elements, one element of the second pair comprising a contact point, the other element of the second pair comprising a contact arm for engaging the contact point, one movable element of each pair of control elements being arranged to be moved by the drive means through a range of more than one cycle of movement; transmission means between the two elements moved by the drive means, said transmission means being arranged to move the control elements at different speed for causing the control elements to be progressively displaced relative to each other; means to electrically control the direction of movement of the drive means by the position of the first contact arm at one or the other side of the neutral point; means to stop the drive means in response to the first contact arm reaching the neutral point, and the second contact arm simultaneously reaching the contact point as controlled by the progressively changed displacement between the contact arms, the original relative position of the control elements determining the number of cycles of movement or fractions thereof required for bringing both contact arms in simultaneous engagement with the neutral point and the contact point respectively; means to start the movement of the drive means always in the same direction independent of the control elements; means to connect the drive means for movement of the contact arms toward the neutral point and the contact point respectively in response to the second contact arm reaching the contact point for the first time; and means for maintaining said last mentioned direction of rotation of the drive means until the drive means are stopped.

5. Control apparatus as described in claim 1 in combination with means for adjusting the positions of control elements operated otherwise than by the drive means.

6. Control apparatus as described in claim 1 in combination with means for adjusting the positions of control elements operated otherwise than by the drive means independently of each other.

7. Control elements as described in claim 1 in combination with yieldable means for connecting the drive means with the control elements; and manual means operable independently of the drive means for adjusting the control elements operated by the drive means.

8. Control apparatus as described in claim 1 in combination with means to retard the movements of the drive means in response to the drive means approaching the position in which they are stopped.

9. Control apparatus for placing a useful load in a predetermined position, comprising reversible drive means capable of making several cycles of movement for placing the useful load in the predetermined position; means for rendering the drive means operative; a pair of relatively movable control elements, one element comprising conducting means having a neutral point, the other element comprising a contact arm for engaging the conducting means; a second pair of relatively movable control elements, one element of the second pair comprising a contact point, the other element of the second pair comprising a contact arm for engaging the contact point, one movable element of each pair of control elements being arranged to be moved by the drive means through a range of more than one cycle of movement; transmission means between the two elements moved by the drive means, said transmission means being arranged to move the control elements at different speed for causing the control elements to be progressively displaced relative to each other; relay means for electrically controlling the direction of movement of the drive means and for stopping the drive means in response to the first contact arm reaching the neutral point and the second contact arm simultaneously reaching the contact point, as controlled by the progressively charged displacement between the contact arms, the original relative position of the control elements determining the number of cycles of movement or fractions thereof required for bringing both contact arms in simultaneous engagement with the neutral point and the contact point respectively.

10. Control apparatus for placing a useful load in a predetermined position, comprising reversible drive means capable of making several cycles of movement for placing the useful load in the predetermined position; means for rendering the drive means operative; a plurality of selectors, each selector comprising a first and a second pair of relatively movable control elements, one element of each first pair comprising conducting means having a neutral point, the other element of each first pair comprising a contact arm for engaging the corresponding conducting means, each second pair comprising one element having a contact point, the other element of each second pair comprising a contact arm for engaging the corresponding contact point; one movable element of each first and second pair of control elements being arranged to be moved by the drive means through a range of more than one cycle of movement; transmission means coupling the two elements moved by the drive means, said transmission means being arranged to move the coupled control elements of each pair at different speed for causing the said control elements to be progressively displaced relative to each other; means for selectively energizing one of said selectors; means to electrically control the direction of movement of the drive means by the position of the first contact arm of the selected selector at one or the other side of the neutral point; and means to stop the drive means in response to the first contact arm of the selected selector reaching the corresponding neutral point and the second contact arm of the selected selector simultaneously reaching the corresponding contact point, as controlled by the progressively changed displacement between the control elements, the original relative positions of the control elements of the selected selector determining the number of cycles of movement or fractions thereof required for bringing both contact arms of the selected selector in simultaneous engagement with the corresponding neutral point and the corresponding contact point respectively.

11. Control apparatus for placing a useful load in a predetermined position, comprising reversible drive means capable of making several revolutions for placing the useful load in the predetermined position; means for rendering the drive means operative; a plurality of selectors, each selector comprising a first and a second pair of relatively movable control elements, one element of each first pair comprising conducting members separated by a gap, the other element of each first pair comprising a rotary contact arm for engaging the corresponding conducting members and arranged to bridge the corresponding gap, each second pair comprising one element having a contact point, the other element of each second pair comprising a rotary contact arm for engaging the corresponding contact point; the rotary contact arm of each first and second pair of control elements being arranged to be rotated by the drive means through a range of more than one revolution; transmission means coupling the two contact arms of each pair, said transmission means being arranged to move the coupled contact arms at different relative speed for causing the said contact arms to be progressively displaced relative to each other; means for selectively energizing one of said selectors; means to electrically control the direction of rotation of the drive means by the position of the first contact arm of the selected selector at one or the other side of the gap; and means to stop the drive means in response to the first contact arm of the selected selector bridging the corresponding gap and the second contact arm of the selected selector simultaneously reaching the corresponding contact point, as controlled by the progressively changed displacement between the contact arms, the original relative positions of the contact arms of the selected selector determining the number of revolutions or fractions thereof required for bringing both contact arms of the selected selector in simultaneous engagement with the corresponding gap and the corresponding contact point respectively.

12. Control apparatus for placing a useful load in a predetermined position, comprising a reversible motor capable of placing the useful load in the predetermined position; a plurality of selectors, each selector comprising a first and a second pair of relatively movable control elements, one element of each pair comprising conducting members separated by a gap, the other element of each pair comprising a contact arm for engaging the corresponding conducting members and arranged to bridge the gap, each second pair comprising one element having a contact point, the other element of each second pair comprising a contact arm for engaging the corresponding contact point, one movable element of each first and second pair of control elements being arranged to be rotated by the motor through a range of more than one revolution; transmission means coupling the two elements of each pair rotated by the drive means, said transmission means being arranged to rotate the coupled control elements at different relative speed for causing the said control elements to be progressively displaced relative to each other; means for starting the motor; means for selectively energizing one of the selectors; relay means having two coils for controlling the direction of rotation of the motor in response to one coil being energized and for stopping the motor in response to both coils being energized; and means to energize one of the coils by the first contact arm of the selected selector engaging the corresponding conducting members at one or the other side of the corresponding gap and the second contact arm of the selected selector simultaneously reaching the corresponding contact point and to energize both relay coils by the first contact arm of the selected selector reaching the corresponding gap and the second contact arm of the selected selector simultaneously reaching the corresponding contact point, as controlled by the progressively changed displacement between the contact arms, the original relative positions of the contact arms of the selected selector determining the number of the revolutions or fractions thereof required for bringing both contact arms of the selected selector in simultaneous engagement with the corresponding gap and the corresponding contact point respectively.

13. A control apparatus as described in claim 12 in combination with means for maintaining the direction of rotation of the motor as established by energizing one of the relay coils, independent of the positions of the contact arms of the selected selector until the said contact arms reach their positions for stopping the motor.

14. Control apparatus for placing a useful load in a predetermined position, comprising reversible drive means capable of making several revolutions for placing the useful load in the predetermined position; a plurality of selectors, each selector comprising a first and a second pair of relatively movable control elements, one element of each pair comprising conducting members separated by a gap, the other element of each pair comprising a contact arm for engaging the corresponding conducting members and arranged to bridge the gap, each second pair comprising one element having a contact point, the other element of each second pair comprising a contact arm for engaging the corresponding contact point, one movable element of each first and second pair of control elements being arranged to be rotated by the drive means through a range of more than one revolution; transmission means coupling the two movable elements of each pair rotated by the drive means, said transmission means being arranged to rotate the coupled movable control elements at different relative speed for causing the said control elements to be progressively displaced relative to each other; means for starting the drive means independent of the control elements; relay means having two coils and switch arms for controlling the direction of rotation of the drive means in response to one coil being energized and for stopping the drive means in response to both coils being energized; means to energize momentarily one of the coils by the first contact arm of the selected selector engaging the corresponding conducting members at one or the other side of the corresponding gap and the second contact arm of the selected selector simultaneously reaching the corresponding contact point the energized relay coil thereby attracting the corresponding switch arms; and means to retain the switch arms attracted independent of the relative positions of the control elements of selected selector, said energizing means being further energized to energize both relay coils by the first contact arm of the selected selector reaching the corresponding gap and the second contact arm of the selected selector simultaneously reaching the corresponding contact point, as controlled by the progressively changed displacement between the contact arms, the original relative positions of the contact arms of the selected selector determining the number of the revolutions or fractions thereof required for bringing both contact arms of the selected selector in simultaneous engagement with the corresponding gap and the corresponding contact point respectively.

15. A control apparatus as described in claim 14 in which said retaining means comprises impedance means included in connections between the relay coils and a source of current.

16. A control apparatus as described in claim 12 in which said relay means comprises a beam-type switch arm composed of two members yieldably joined together for simultaneous undeflected movement under attraction of one of the relay coils for rendering the motor operative, and arranged to be deflected in the same direction in response to both relay coils being energized for stopping the motor.

17. A control apparatus as described in claim 12 in which said relay means comprises a beam-type switch arm composed of two members yieldably joined together for simultaneous undeflected movement under the attraction of one of the relay coils for rendering the motor operative, and arranged to be deflected in the same direction in response to both relay coils being energized for stopping the motor; impedance means; and means to include the impedance means in the motor connections in response to and during the undeflected movements of the switch arm.

18. A control apparatus as described in claim 12 in which said relay means comprises a beam-type switch arm composed of two members yieldably joined together for simultaneous undeflected movement under the attraction of one of the relay coils for rendering the motor operative, and arranged to be deflected in the same direction in response to both relay coils being energized for stopping the motor; impedance means; means to include the impedance means in the motor connections in response to and during the undeflected movements of the switch arm; and means to retard the undeflected movements of the switch arm.

MICHEL N. YARDENY.